US012722499B2

(12) United States Patent
Cimino

(10) Patent No.: US 12,722,499 B2
(45) Date of Patent: Sep. 1, 2026

(54) SYSTEMS AND METHODS FOR ADAPTIVE SENSOR-BASED PROVISIONING

(71) Applicant: Capital One Services, LLC, McLean, VA (US)

(72) Inventor: Paul L. Cimino, Chester Springs, PA (US)

(73) Assignee: Capital One Services, LLC, McLean, VA (US)

( * ) Notice: Subject to any disclaimer, the term of this patent is extended or adjusted under 35 U.S.C. 154(b) by 384 days.

(21) Appl. No.: 18/364,927

(22) Filed: Aug. 3, 2023

(65) Prior Publication Data

US 2025/0042257 A1 Feb. 6, 2025

(51) Int. Cl.
*B60L 3/12* (2006.01)
*G07C 5/08* (2006.01)

(52) U.S. Cl.
CPC ................ *B60L 3/12* (2013.01); *G07C 5/085* (2013.01)

(58) Field of Classification Search
CPC .................................. B60L 3/12; G07C 5/085
See application file for complete search history.

(56) References Cited

U.S. PATENT DOCUMENTS

2020/0074491 A1* 3/2020 Scholl ................. G06F 11/3423
2020/0357198 A1* 11/2020 Bennett ................... G06F 16/27
2020/0401952 A1* 12/2020 Gardner ................ H04L 9/3236
2024/0367486 A1* 11/2024 Nachawati ............. B60H 1/143

OTHER PUBLICATIONS

English Translation of JP2018173697A Title: Shared Use Charge Calculation System Author: Kanamori Akira Date: Nov. 8, 2018 (Year: 2018).*
English Translation of KR20190014192A Title: In-Vehicle Sound Wave Device for Providing Door Locking/Unlocking Service Author: Kim et al. Date: Feb. 12, 2019 (Year: 2019).*

* cited by examiner

*Primary Examiner* — Steven Vu Nguyen
(74) *Attorney, Agent, or Firm* — Foley & Lardner LLP

(57) ABSTRACT

Methods and systems for sensor-based provisioning for one or more users of a vehicle are described herein. In some aspects, the system may determine a first user of the vehicle and execute sensor functions to store first information associated with the vehicle. The system may determine a second user and execute the sensor functions to store second information associated with the vehicle. The system may retrieve total resource usage associated with the vehicle. The system may determine a fractional variable for the first user and a fractional variable for the second user. This allows the system to assign a first portion of the total resource usage to the first user based on the first fractional variable and a second portion of the total resource usage to the second user based on the second fractional variable.

20 Claims, 4 Drawing Sheets

SYSTEMS AND METHODS FOR ADAPTIVE SENSOR-BASED PROVISIONING

SUMMARY

There are many benefits to apportioning the responsibility of owning and maintaining a shared asset. For example, by apportioning the responsibility of ownership and maintenance of high-resource-consuming shared assets, any ongoing resource usage on the shared asset becomes more equitable, and any maintenance responsibilities are offloaded from any single party. Furthermore, by apportioning the responsibility of ownership and maintenance of these shared assets, each owner can enjoy access to the asset with substantially less exposure. However, despite these benefits and the wide-ranging number of potential applications, practical implementations have been hindered by several technical problems.

First, it may be challenging to determine individual asset usage as owners may use the shared asset in different ways, contributing to a higher or lower resource usage. Additionally, it may be challenging to determine individual usage as owners may have varying degrees of responsibility for ownership and maintenance based on specific arrangements. Furthermore, the process for determining individual usage can often output inaccurate results. For example, a common apportionment of responsibility is based on how much time an owner used the asset, with the responsibilities and ownership directly correlated, which may not be the best method for all scenarios. For example, the shared asset could be an exotic vehicle shared by two owners. The first owner uses the vehicle for five hours to race at a track, and the second owner uses the vehicle for five hours to make trips to purchase groceries. In the example, the vehicle was in the possession of the first and the second owner for the same amount of time, and thus, the responsibility for the asset would be equal. It would be more equitable for the first owner to assume more responsibility than the second owner based on the greater contributed loss of value due to the nature of the first owner's use of the asset. Finally, it can be challenging to track contributed loss of value when there are many owners sharing responsibility for a shared asset. For example, if 20 owners share a luxury property, keeping accurate records of contributed loss of value and communicating them among all owners can be time consuming, and it can be challenging to prove the contributed loss of value in the event of a dispute. These technical problems may present an inherent problem with attempting to use an artificial intelligence-based solution in determining resource provisioning among multiple users associated with a shared asset.

Accordingly, methods and systems are described herein for novel uses and/or improvements to determining individual asset usage corresponding to a shared asset. As one example, methods and systems are described herein for adaptive sensor-based resource provisioning for determining fractional resource usage contributed by different users of a shared asset.

Existing systems fail to consider usage metrics and base resource consumption to determine fractional resource usage contribution by each fractional owner leading to equitable resource contributions from each fractional owner. For example, existing systems do not take into consideration the resource usage or consumption attributed to the shared asset by each owner due to a large amount of aggregated sensor data and do not determine the fractional variables for each owner based on the contributed loss of value. However, the difficulty in adapting artificial intelligence models for this practical benefit faces several technical challenges, such as how to determine the fractional variables for each owner based on large amounts of aggregated sensor data.

To overcome these technical deficiencies in adapting artificial intelligence models for this practical benefit, methods and systems disclosed herein consider usage metrics such as vehicle terrain (e.g., off-road or on-road driving), vehicle velocity (e.g., driving speed and direction), and vehicle operating temperature. Furthermore, methods and systems disclosed herein also consider base metrics such as resource consumption related to storage, loans, insurance, and charging. The model is then trained to use the sensor data associated with usage and base resource consumption to apportion a portion of the total resource usage or consumption of the shared asset to each owner in an equitable manner based on usage and base resource consumption. For example, by considering usage and base resource consumption associated with each owner, the model can generate and apportion an appropriate and scaled responsibility to each owner of the shared asset, thereby overcoming the challenge of using aggregated sensor data from the shared asset. Accordingly, the methods and systems provide the benefit of considering fractional resource usage contribution by each fractional owner, leading to equitable resource contributions from each fractional owner.

In some aspects, methods and systems are provided to provision resources for a vehicle between one or more users and manage one or more sensors in the vehicle. The system can do this by determining, from a plurality of users, a first user of a vehicle based on authentication provided by the first user and, in response to determining the first user of the vehicle, executing one or more sensor functions to store, with respect to the first user, first information from a plurality of sensors associated with the vehicle. The first information can include sensor data related to usage of the vehicle by the first user and sensor data related to storage and fueling of the vehicle while associated with the first user during a first period of time. The system can then determine, from the plurality of users, a second user of the vehicle based on the authentication provided by the second user, and in response to determining the second user of the vehicle, the system can execute the one or more sensor functions to store, with respect to the second user, second information from the plurality of sensors associated with the vehicle. The second information can include sensor data related to the usage of the vehicle by the second user and sensor data related to storage and fueling of the vehicle while associated with the second user during a second period of time. The system can retrieve total resource usage associated with the vehicle for a total period of time including the first period of time and the second period of time and process, using a machine learning model, the first information stored with respect to the first user and the second information stored with respect to the second user to determine a first fractional variable for the first user and a second fractional variable for the second user. The system can assign a first portion of the total resource usage to the first user based on the first fractional variable and a second portion of the total resource usage to the second user based on the second fractional variable.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
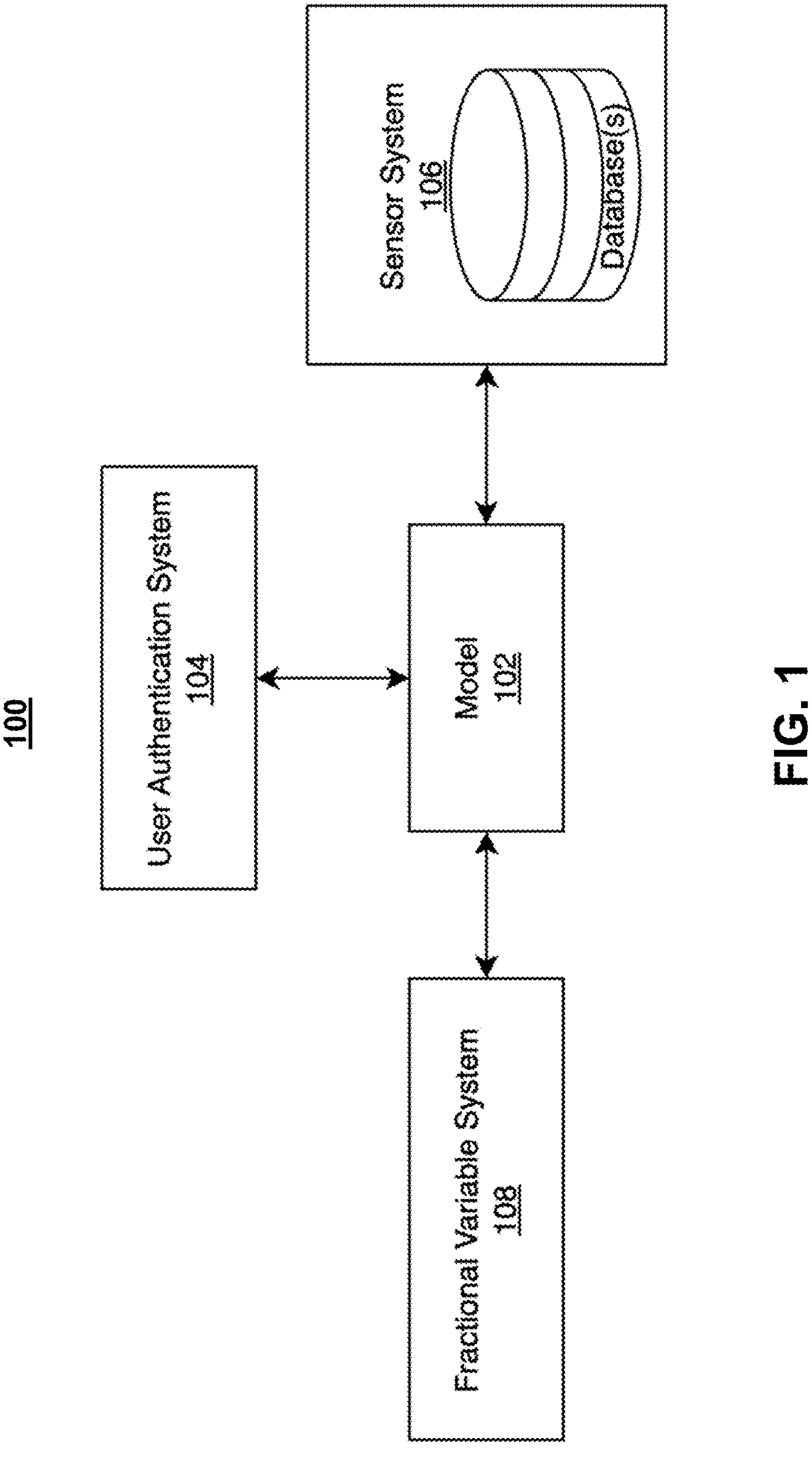
FIG. 1 shows an illustrative diagram for provisioning resources for a vehicle between one or more users and managing one or more sensors in the vehicle, in accordance with one or more embodiments.

FIG. 1 shows an illustrative diagram for provisioning resources for a vehicle between one or more users and managing one or more sensors in the vehicle, in accordance with one or more embodiments. For example, FIG. 1 includes system 100, which includes model 102, which may interact with user authentication system 104, sensor system 106, and fractional variable system 108 to overcome the practical problem of how to determine fractional variables (e.g., contributed loss of value) associated with fractional resource usage contributed by different users. Sensor system 106 may have access to databases that include usage metrics from a vehicle, such as vehicle terrain, velocity, operating temperature, environmental conditions, surface conditions, system status, and engine stress, as well as other metrics, such as storage fees, loan payments, insurance payments, or charging costs. These metrics can be used to consider the loss of value contributed to the shared asset by each owner and determine a fractional variable for each user as identified by the user authentication system 104 and fractional variable system 108.

For example, user authentication system 104 may be used to identify a user who is using the vehicle. Identifying a user can be accomplished based on authentication methods (e.g., a unique PIN, a key card, a physical key, or biometrics). After a user is identified, model 102 can instruct sensor system 106 to update the sensor database with metrics pertaining to the user identified by user authentication system 104. Sensor system 106 may access databases storing sensor information from a vehicle (e.g., vehicle terrain or storage costs). Sensor system 106 may add new sensor information from a vehicle associated with the present user identified by user authentication system 104. Sensor system 106 may also retrieve and transmit sensor data associated with a vehicle to model 102. Model 102 may use the sensor data from sensor system 106 and the user data from user authentication system 104 to determine the total resource usage associated with a vehicle. Model 102 may retrieve the sensor information from sensor system 106 and transmit the sensor information retrieved from sensor system 106 as well as user information determined by user authentication system 104 to fractional variable system 108, which can determine a fractional variable associated with the user. Model 102 can access the fractional variable associated with the user and use the fractional variable associated with the user to assign a portion of the total resource usage to each user of the vehicle. As such, the system may consider fractional resource usage contributed by each fractional owner, thereby leading to a fair resource contribution from each fractional owner based on the respective contributed loss of value. By determining the fractional resource usage contributed by each fractional owner, the resource contributions are more fair as the contribution amount is directly correlated with each user's action (e.g., if a first user takes the vehicle racing and the second user uses the vehicles to get groceries, the first user will likely have a higher resource contribution corresponding to the higher fractional resource usage).

Model 102 may be responsible for outputting the individual asset usage associated with each user of the shared asset. To determine individual asset usage, model 102 needs to access data from fractional variable system 108 as well as sensor system 106. With the data from fractional variable system 108, the model can assign portions of the total resource usage to each user based on their individual asset usage.

Furthermore, model 102 can use an artificial neural network (ANN) to predict which user corresponds to the portion of the total resource usage. Specifically, the ANN can determine the probability that the portion of the total resource usage identified belongs to each user based on the authentication information and period of time.

Fractional variable system 108 may include a variety of sensors that can determine attributes associated with the asset which cause depreciation. For example, in the case of a shared vehicle, sensors may include accelerometers and gyroscopes as well as equipment to measure engine statistics or other consumables for the vehicle. Other shared assets may include an electric vehicle where charging is an attribute in determining fractional variables. In another example, if the vehicle is a yacht, measuring speed can indicate engine stress or potential hull damage associated with higher knots, which may be an attribute in determining fractional variables.

User authentication system 104 may be responsible for identifying who is using the shared asset at what time. For example, in the case of a shared vehicle, sensors may detect who is using a vehicle based on seat sensor data, which records weight or seat adjustment settings. Alternatively, a user may authenticate using a unique RFID key fob, biometric identification, the proximity of a paired Bluetooth device, or a unique pin.

The system may be used to determine a user of a vehicle based on authentication provided by the user. In disclosed embodiments, authentication may include verifying the identity of a user attempting to access or control the vehicle. For example, a user may be granted access to the vehicle only after providing knowledge-based credentials (e.g., passwords, PINs, or one-time passwords), possession-based credentials (e.g., traditional car key, RFID key fob, smartphone-based key), or inherence-based credentials (e.g., fingerprint, facial recognition, or seat biometrics).

The system may be used to apportion total resource usage between one or more users sharing a vehicle. In disclosed embodiments, a resource may include any element or feature that contributes to the overall functionality, performance, or maintenance. For example, the system may identify, through a variety of onboard sensors, resources consumed by a user including transmission systems, tires, and brake systems, as well as other consumable resources with a limited lifespan. Resources can also include the fuel for the vehicle, such as gasoline, diesel, electricity, or hydrogen.

The system may be used to provision resources for a vehicle among one or more users. In disclosed embodiments, a vehicle may include any mode of transportation designed to move people or items that are made of parts, some of which are consumable by the users of the vehicle. For example, a vehicle could be a car, an electric car, a boat, an airplane, or another mode of transportation that can be shared among one or more individuals.

The system may be used to determine a fraction variable associated with a user. In disclosed embodiments, a fractional variable may include information associated with a user, including resource consumption and usage associated with the user. For example, a first user may have used a vehicle in a race, which is associated with high resource consumption as reflected by the onboard vehicle sensors and fuel consumption. A second user may have used a vehicle to drive to work, which is associated with low resource consumption as reflected by the onboard vehicle sensors and fuel consumption. The fractional variable associated with the first user may be higher than the fractional variable associated with the second user due to the resource consumption of each user.

The system may be used to determine fractional variables using sensor data. In disclosed embodiments, sensor data may include information collected from one or more sensors onboard a vehicle that monitors the external or internal environment of the vehicle. Sensor data may also include information collected about the vehicle. Sensor data may be collected by sensors (e.g., sensors including sensor system 106) that measure information about the vehicle, including accelerometers, a speedometer, gyroscopes, a GPS, LiDAR scanners, radar scanners, camera modules, a power meter, coolant temperature sensors, cylinder head temperature sensors, or exhaust gas temperature sensors. Sensor data may be collected by sensors that measure the external or internal vehicle environment, including thermometers, hygrometers, cameras, LiDAR scanners, a GPS, or gyroscopes.

Figure 2:
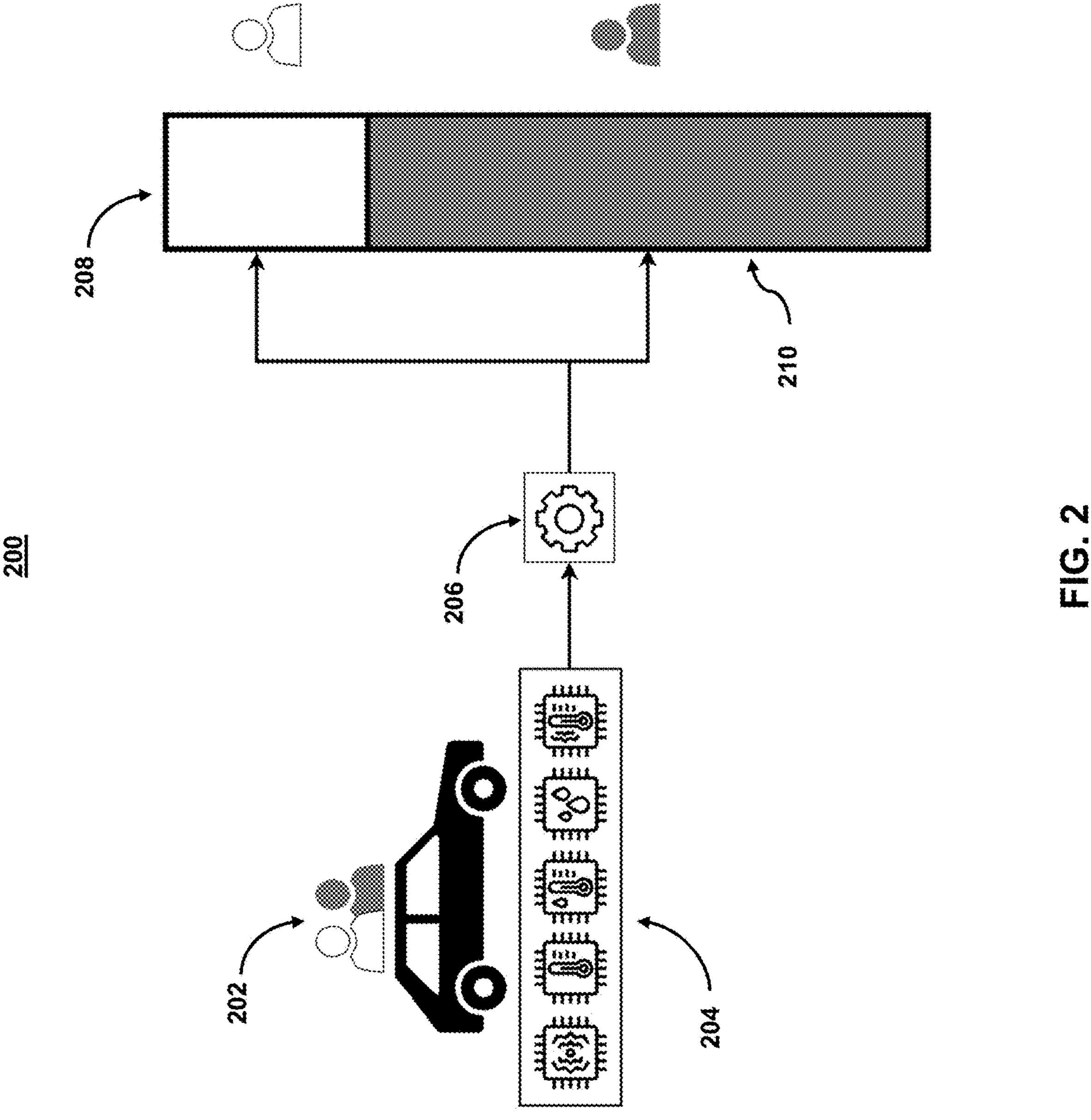
FIG. 2 shows an illustrative diagram for using a machine learning model for resource provisioning for users of a vehicle, in accordance with one or more embodiments.

FIG. 2 shows an illustrative diagram for using a machine learning model to determine fractional variables for users of a vehicle, in accordance with one or more embodiments. FIG. 2 includes system 200, which includes model 206, which receives inputs from sensors 204 and user authentications 202. Based on information from sensors 204 and user authentications 202, model 206 can determine fractional variable 208 and fractional variable 210. By identifying fractional variable 208 and fractional variable 210, the system can fairly provision resources for a vehicle among users by taking into account resource consumption in the form of fractional variables associated with each user.

Sensors 204 can include gyroscopes, temperature sensors, coolant temperature sensors, humidity sensors, and other sensors collecting data external or internal to the vehicle. User authentications 202 may include users who use the vehicle by authenticating to the vehicle using a means of authentication such as a PIN or biometric data as well as the time intervals in which they used the vehicle. When input into model 206, the system can aggregate user authentications 202 and data from sensors 204 to identify resource consumption by each user from user authentications 202. For example, model 206 may determine that a first user drove the vehicle in an aggressive manner (e.g., the user is traveling at a high speed, performing fast acceleration, and braking excessively hard) compared to a second user who drove in a less aggressive manner (e.g., the user is traveling at an appropriate speed based on the environment, performing normal acceleration, and braking when necessary). By aggregating this data, the system can determine the fractional variables associated with each user's resource consumption (e.g., the first user may be associated with fractional variable 210, and the second user may be associated with fractional variable 208).

Figure 3:
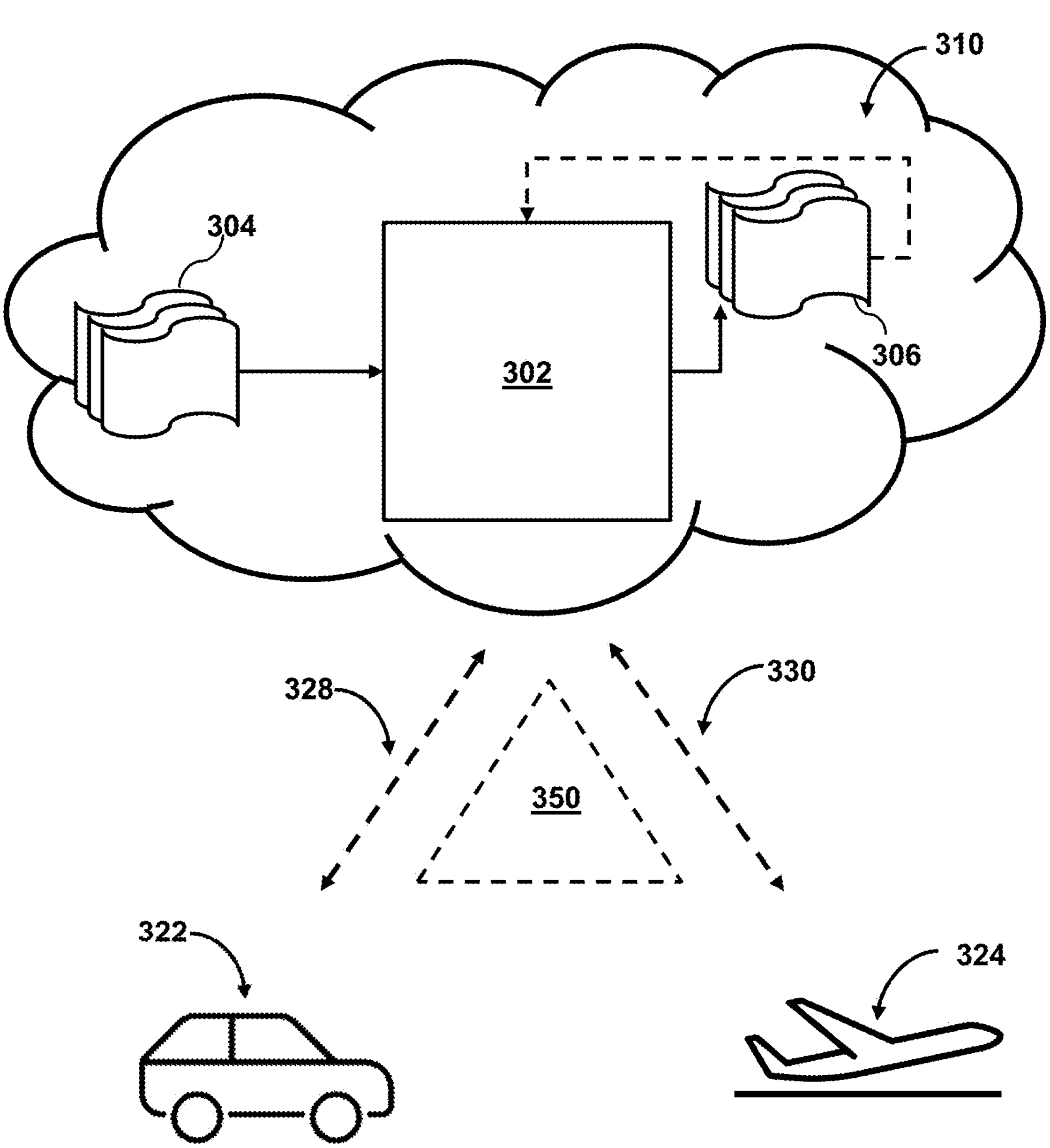
FIG. 3 shows illustrative components for a system used for resource provisioning for users of a vehicle and assigning the resource usage corresponding to the users, in accordance with one or more embodiments.

FIG. 3 shows illustrative components for a system used to determine a fractional variable for users of a vehicle and assign the resource usage corresponding to the users, in accordance with one or more embodiments. For example, FIG. 3 may show illustrative components for using a model to determine fractional variables for users of a vehicle based on resource usage and consumption. As shown in FIG. 3, system 300 may include vehicle 322 and vehicle 324. While shown as a car and plane, respectively, in FIG. 3, it should be noted that vehicle 322 and vehicle 324 may be any vehicle, including, but not limited to, a truck, motorcycle, off-road vehicle, yacht, jet ski, sailboat, airplane, helicopter, or drone. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of vehicle 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of vehicle 322, vehicle 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, both vehicle 322 and vehicle 324 can include a display upon which to display data (e.g., conversational response, queries, and/or notifications).

Additionally, as vehicle 322 and vehicle 324 are shown as a car and a plane, these displays can be used as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328 and 330. Communication paths 328 and 330 may include the Internet, a mobile phone network, a mobile voice or data network (e.g., a 5G or LTE network), a cable network, a public switched telephone network, or other types of communications networks or combinations of communications networks. Communication paths 328 and 330 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include a user authentication system (e.g., user authentication system 104) and a fractional variable system (e.g., fractional variable system 108).

Cloud components 310 may access sensor data from vehicle 322 and/or vehicle 324.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., driving style or resource consumption associated with a user of vehicle 322 or vehicle 324).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free flowing, with connections interacting in a more chaotic and complex fashion. During testing, an output layer of model 302 may indicate whether or not a given input corresponds to a classification of model 302 (e.g., aggressive driver, passive driver, activity performed with the vehicle).

In some embodiments, the model (e.g., model 302) may automatically perform actions based on outputs 306. In some embodiments, the model (e.g., model 302) may not perform any actions. The output of the model (e.g., model 302) may be used to assign a fractional variable to users of a shared vehicle to fairly distribute the total resource usage based on the user's respective resource consumption.

System 300 also includes API layer 350. API layer 350 may allow the system to generate summaries across different devices. In some embodiments, API layer 350 may be implemented on vehicle 322 or vehicle 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350 such that there is a strong adoption of SOAP and RESTful Web services, using resources like Service Repository and Developer Portal, but with low governance, standardization, and separation of concerns. Alternatively, system 300 may be fully based on API layer 350 such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between the front end and back end. In such cases, API layer 350 may use RESTful APIs (exposition to the front end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as a standard for external integration.

Figure 4:
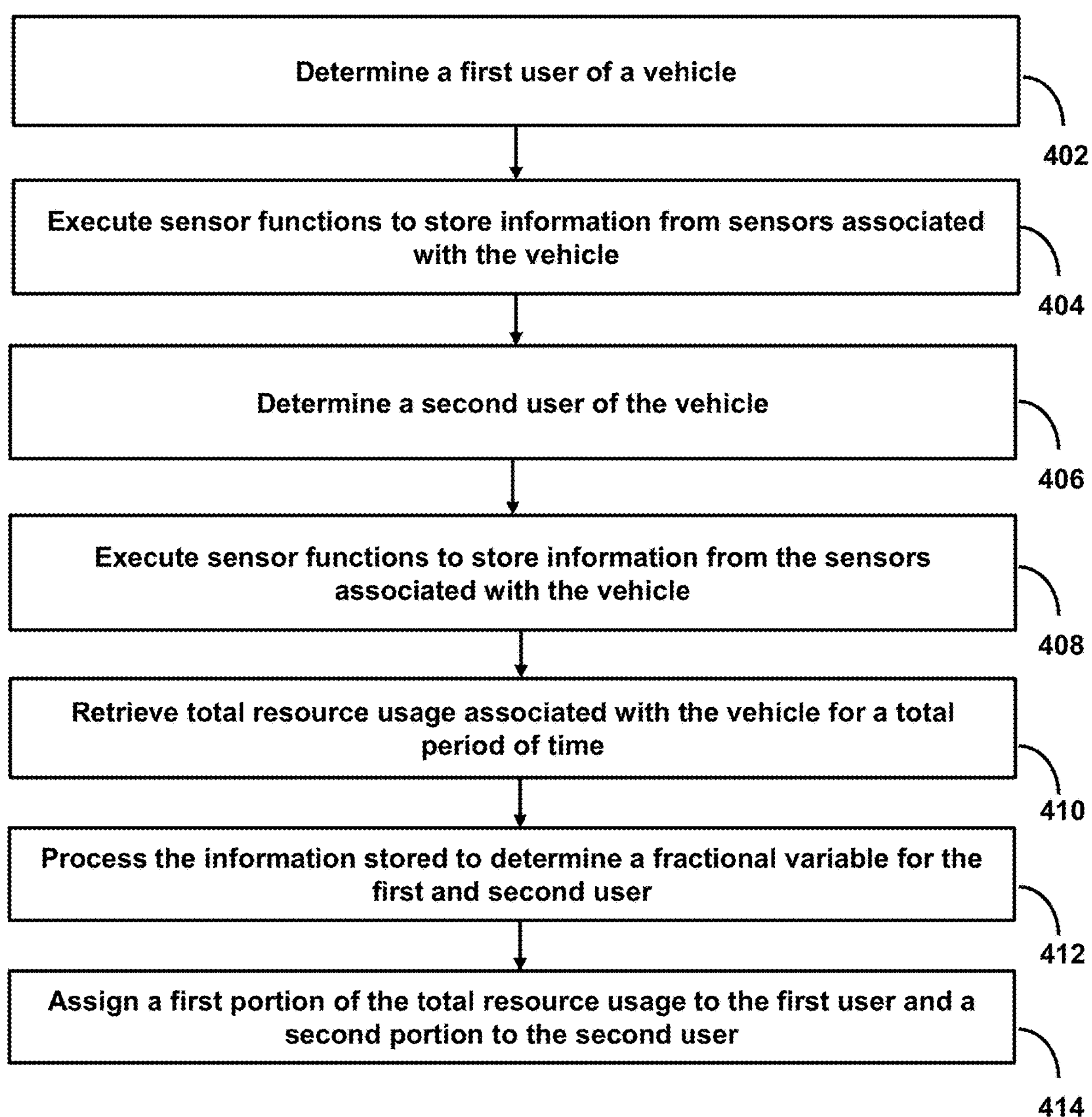
FIG. 4 shows a flowchart of the steps involved in resource provisioning for users of a vehicle and assigning the resource usage corresponding to the users, in accordance with one or more embodiments.

FIG. 4 shows a flowchart of the steps involved in determining a fractional variable for users of a vehicle and assigning the resource usage corresponding to the users, in accordance with one or more embodiments. For example, the system may use process 400 (e.g., as implemented on one or more system components described above) in order to consider fractional variables associated with each user, leading to a fair apportioning of resources based on respective resource usage.

At step 402, process 400 (e.g., using one or more components described above) determines a first user of a vehicle. For example, the system may determine, from a plurality of users, a first user of a vehicle based on authentication provided by the first user. For example, the system may determine a user as a first user based on a unique PIN or biometric authentication. By determining a first user of a vehicle, the system can apportion resource usage to users accurately and can avoid attributing resource usage to the wrong user.

In some embodiments, the user may provide a knowledge-based method, possession-based method, or inherence-based means of authentication. For example, the authentication provided by the first user is a knowledge-based method, possession-based method, or inherence-based method, wherein the knowledge-based method comprises something known by the first user, wherein the possession-based method comprises something the first user has, and wherein an inherence-based method comprises something the first user is. For example, the vehicle may be unlocked by a knowledge-based method (e.g., a unique PIN entered on a door panel or a password entered on a touchscreen). As another example, the vehicle may be unlocked by a possession-based method (e.g., a unique RFID key or a smartphone paired to the vehicle). As another example, the vehicle may be unlocked by a user who authenticates by an inherence-based method (e.g., using a thumbprint or face scan). By providing various means of authentication, the system can determine a fractional variable corresponding to the actual user resulting in identifying the user accurately and therefore apportioning total resource usage accordingly, resulting in a fair portion for each user.

At step 404, process 400 (e.g., using one or more components described above) executes sensor functions to store information from sensors associated with the vehicle. For example, the system may, in response to determining the first user of the vehicle, execute one or more sensor functions to store, with respect to the first user, first information from a plurality of sensors associated with the vehicle, the first information including sensor data related to usage of the vehicle by the first user and sensor data related to storage and fueling of the vehicle while associated with the first user during a first period of time. For example, the system may store information from onboard vehicle sensors, such as speed data from an accelerometer. By executing sensor functions to store information from sensors associated with the vehicle, the system may compile data from sensors on the vehicle, which can be used to determine an accurate total resource usage associated with the vehicle.

In some embodiments, the system may retrieve changes in terrain from vehicle sensors. For example, the system may retrieve the total resource usage associated with the vehicle for the total period of time including the first period of time and the second period of time further by retrieving changes in terrain measured by an accelerometer, a gyroscope, a GPS, a LiDAR scanner, a radar scanner, or a camera module during the total period of time and incorporating the changes in the terrain into the total resource usage associated with the vehicle. For example, if a user frequently goes off-roading with the vehicle, or drives on rough, rocky, or steep incline terrain, their individual fractional variable may be greater than a user who primarily uses the vehicle for commuting on highways and city roads without extreme terrain. Extreme terrain can result in the excessive consumption of resources associated with the vehicle, including the tires, undercarriage, suspension, brakes, engine, and fuel. By retrieving changes in terrain from vehicle sensors, the system may be better able to determine total resource usage, specifically resource usage associated with changes in terrain.

In some embodiments, the system may retrieve changes in velocity from vehicle sensors. For example, the system may retrieve the total resource usage associated with the vehicle for the total period of time including the first period of time and the second period of time further by retrieving changes in velocity measured by a speedometer, a GPS, an accelerometer, or power meter during the total period of time and incorporating the changes in the velocity into the total resource usage associated with the vehicle. For example, if a user frequently drives a vehicle at high speeds on the highway or for racing, their individual fractional variable may be greater than a user who primarily uses the vehicle for city driving (e.g., driving at slower speeds). Operating a vehicle at high velocity can result in excessive consumption of resources associated with the vehicle, including the tires, brakes, engine, aerodynamic components, and fuel. By retrieving changes in velocity from vehicle sensors, the system may be able to better determine total resource usage, specifically resource usage associated with vehicle velocity.

In some embodiments, the system may retrieve changes in operating temperature from vehicle sensors. For example, the system may retrieve the total resource usage associated with the vehicle for the total period of time including the first period of time and the second period of time further by retrieving changes in an operating temperature by using a coolant temperature sensor, a cylinder head temperature sensor, or an exhaust gas temperature sensor during the total period of time and incorporating the changes in the operating temperature into the total resource usage associated with the vehicle. For example, if a user frequently operates their vehicle under heavy loads, or at steep inclines, their individual fractional variable may be greater than a user who primarily operates their vehicle under lighter loads and moderate or no incline. Operating a vehicle at a high operating temperate can stress and consume temperature-sensitive resources such as engine components, transmission components, cooling systems, battery life, exhaust systems, lubricants, and vehicle fluids. By retrieving changes in operating temperature from vehicle sensors, the system may be able to better determine total resource usage, specifically resource usage associated with various operating temperatures.

In some embodiments, the system may retrieve changes in environmental conditions from vehicle sensors. For example, the system may retrieve the total resource usage associated with the vehicle for the total period of time including the first period of time and the second period of time further by retrieving changes in environmental conditions by using a thermometer, a hygrometer, a camera, or a LiDAR scanner during the total period of time and incorporating the changes in the environmental conditions into the total resource usage associated with the vehicle. For example, a user who operates their vehicle during extreme weather events and exposes the vehicle to conditions such as heat waves, snowstorms, salty roads, high humidity, or flash floods subjects the vehicle to greater stress, which may result in their individual fractional variable being greater than a user who primarily operates the vehicle in mild climates without weather extremes or poor weather conditions. Operating a vehicle in poor environmental conditions can lead to higher resource usage, leading to degradation of the vehicle's exterior and interior, undercarriage, and suspension. By retrieving changes in environmental conditions, the system may be able to better determine total resource usage, specifically resource usage associated with changes in environmental conditions.

In some embodiments, the system may retrieve changes in surface conditions from vehicle sensors. For example, the system may retrieve the total resource usage associated with the vehicle for the total period of time including the first period of time and the second period of time further by retrieving changes in surface conditions by using an accelerometer, a GPS, or a gyroscope during the total period of time and incorporating the changes in the surface conditions into the total resource usage associated with the vehicle. For example, a user operating the vehicle on poorly maintained roads or with lots of debris may result in their individual fractional variable being greater than a user who primarily operates the vehicle on well-maintained roads with minimal debris. Operating a vehicle on a road with poor surface conditions can lead to higher resource usage, leading to the degradation of tires, suspension systems, and brakes. By retrieving changes in surface conditions, the system may be able to better determine total resource usage, specifically resource usage associated with changes in surface conditions.

In some embodiments, the system may retrieve changes in the status of vehicle systems. For example, the system may retrieve the total resource usage associated with the vehicle for the total period of time including the first period of time and the second period of time further by retrieving changes in the status of vehicle systems using an on-board diagnostics (OBD) port during the total period of time and incorporating the changes in the status of the vehicle systems into the total resource usage associated with the vehicle. For example, if a user neglects vehicle maintenance recommendations and requirements provided by the OBD system, it may result in their individual fractional variable being greater than a user who routinely maintains the vehicle and swiftly resolves errors, warnings, and alerts provided by the OBD system. Operating a vehicle with errors, warnings, or alerts can lead to higher resource usage and can consume vehicle resources including engine components, brake components, tires, and cooling components. By retrieving changes in the status of vehicle systems, the system may be able to better determine total resource usage, specifically resource usage associated with the status of vehicle systems.

In some embodiments, the system may retrieve changes in engine stress from vehicle sensors. For example, the system may retrieve the total resource usage associated with the vehicle for the total period of time including the first period of time and the second period of time further by retrieving changes in engine stress using an accelerometer, a tachometer, or a strain gauge during the total period of time and incorporating the changes in the engine stress into the total resource usage associated with the vehicle. For example, a user who operates a vehicle in a manner that causes high engine stress, such as rapid acceleration, driving on a steep incline, or heavy towing, may have a higher individual fractional variable than a user who operates the vehicle in a less strenuous manner avoiding rapid acceleration, steep inclines, and heavy towing. Operating a vehicle in a manner that causes high engine stress can lead to high resource usage and consumption, which can degrade engine components, fuel systems, and cooling systems. By retrieving changes in engine stress, the system may be able to better determine total resource usage, specifically resource usage associated with engine stress.

At step 406, process 400 (e.g., using one or more components described above) determines a second user of the vehicle. For example, the system may determine, from the plurality of users, a second user of the vehicle based on the authentication provided by the second user. For example, the system may determine a user as a second user based on a unique PIN, biometric authentication, or other means of authentication. By determining a second user of the vehicle, the system can apportion resource usage to users accurately and can avoid attributing resource usage to the wrong user.

At step 408, process 400 (e.g., using one or more components described above) executes sensor functions to store information from the sensors associated with the vehicle. For example, the system may, in response to determining the second user of the vehicle, execute the one or more sensor functions to store, with respect to the second user, second information from the plurality of sensors associated with the vehicle, the second information including sensor data related to usage of the vehicle by the second user and sensor data related to storage and fueling of the vehicle while associated with the second user during a second period of time. For example, the system may store information from onboard vehicle sensors, such as speed data from an accelerometer. By executing sensor functions to store information from sensors associated with the vehicle, the system may compile data from sensors on the vehicle, which can be used to determine an accurate total resource usage associated with the vehicle.

At step 410, process 400 (e.g., using one or more components described above) retrieves the total resource usage associated with the vehicle for a total period of time. For example, the system may retrieve total resource usage associated with the vehicle for a total period of time including the first period of time and the second period of time. For example, the system may retrieve the aggregated information from the sensors on board the vehicle over a given time period. For example, the system may retrieve speed, data, and acceleration data between Monday and Friday. By retrieving the total resource usage associated with the vehicle for a total period of time, the system may be able to determine the total resource usage associated with the vehicle.

At step 412, process 400 (e.g., using one or more components described above) processes the information stored to determine a fractional variable for the first and second users. For example, the system may process, using a machine learning model, the first information stored with respect to the first user and the second information stored with respect to the second user to determine a first fractional variable for the first user and a second fractional variable for the second user. For example, the system may determine a fractional variable by apportioning the total resource consumption determined based on the sensor data and user authentication. For example, if a first user uses the vehicle between 10 a.m. and 10:30 a.m. on Monday, the model may correlate the aggregated sensor data with the user to determine the fractional variable based on the amount of resources consumed, of the total resource usage associated with the vehicle, by the user. By processing the information stored to determine a fractional variable for the first and second users, the system may be able to associate resource consumption with specific users, thereby allowing the system to determine fair fractional variables.

At step 414, process 400 (e.g., using one or more components described above) assigns a first portion of the total resource usage to the first user and a second portion to the second user. For example, the system may assign a first portion of the total resource usage to the first user based on the first fractional variable and a second portion of the total resource usage to the second user based on the second fractional variable. For example, the system may assign a portion (e.g., 75%) of the total resource usage to a first user and a second portion (e.g., 25%) of the total resource usage to a second user. The system may determine how much of the total resource usage to assign to a user based on the data gathered from the sensors, which indicates, in conjunction with user authentication, how much resource consumption each user is responsible for. The amount of resource consumption each user is responsible for is directly correlated to the portion of the total resource usage each user is responsible for. By assigning a first portion of the total resource usage to the first user and a second portion to the second user, the system may fairly apportion total resource usage to each user of a vehicle.

In some embodiments, the system may use an artificial neural network (ANN) that takes the total resource usage as input and outputs probabilities. For example, the system may retrieve the total resource usage associated with the vehicle for the total period of time including the first period of time and the second period of time further by inputting, to the machine learning model, the first portion of the total resource usage, wherein the machine learning model is an ANN, and wherein the first portion of the total resource usage includes a plurality of inputs for the ANN, receiving, as an output, probabilities corresponding to the plurality of inputs from the first portion of the total resource usage and calculating the total resource usage using the output. For example, the model may output the probability that the first portion of the total resource usage is associated with the first user and the probability that the second portion of the total resource usage is associated with the second user. By using an ANN to output probabilities, the system can better determine the likelihood that a user is responsible for their corresponding portion of the total resource usage of the vehicle.

In some embodiments, the system may generate a dashboard view of sensor data which can include information such as usage metrics from a vehicle such as vehicle terrain, velocity, operating temperature, environmental conditions, surface conditions, system status, and engine stress, as well as other metrics such as storage fees, loan payments, insurance payments or charging costs. The dashboard view can further include information gathered from one or more sensors associated with the vehicle (e.g., accelerometers, speedometers, gyroscopes, GPSs, LiDAR scanners, radar scanners, camera modules, power meters, coolant temperature sensors, cylinder head temperature sensors, or exhaust gas temperature sensors). Furthermore, this information can be attributed, in a visual manner, to an associated user (e.g., the user associated with a portion of the total resource usage).

Additionally, access to the vehicle can be restricted by not accepting the authentication from the user (e.g., deactivating accounts associated with the authentication methods used by the user) based on information contained in the dashboard. For example, if the dashboard shows that a user is responsible for a portion of the total resource usage but does not resolve their portion of the total resource usage (e.g., by making a payment), the vehicle may prevent the user from using the vehicle.

In some embodiments, it may be beneficial to apportion total resource usage between one or more users sharing ownership of a fleet of vehicles. The amount of resource consumption (e.g., the depreciation expense) associated with a user who owns the fleet can be directly associated with the portion of the user's earnings that are taxed (e.g., higher depreciation of the vehicle leads to a lower amount of earnings on which taxes are based). Therefore, by being able to accurately identify and apportion total resource usage among one or more users sharing a fleet of vehicles, the amount of taxes owed by each user can be reduced. This tax reduction benefit may not be extended to users or groups of users who do not purchase the fleet outright (e.g., users who opt, instead, to lease the vehicles in a fleet). While leasing a vehicle provides a host of benefits such as reduced up-front costs it may limit the tax benefits observed by the shared users. Purchasing vehicles in a fleet allows for tax benefits but requires a large up-front cost. Using a fractional ownership model to purchase the vehicles in a fleet allows the users to observe the tax benefits without the large up-front cost. The larger the depreciation expense, the lower the taxable income, and the lower a company's tax bill. The smaller the depreciation expense, the higher the taxable income and the higher the tax payments owed.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: in response to determining a first user of the electric vehicle based on biometric identification provided by the first user, executing one or more sensor functions to store, with respect to the first user, a first usage profile based on information from a plurality of sensors associated with the electric vehicle, the first usage profile including sensor data related to usage of the electric vehicle by the first user and sensor data related to storage and charging of the electric vehicle while associated with the first user during a first period of time; at a time subsequent to the first period of time, in response to determining a second user of the electric vehicle based on biometric identification provided by the second user, executing the one or more sensor functions to store, with respect to the second user, a second usage profile from the plurality of sensors associated with the electric vehicle, the second usage profile including sensor data related to usage of the electric vehicle by the second user and sensor data related to storage and charging of the electric vehicle while associated with the second user during a second period of time; retrieving total resource usage associated with the electric vehicle for a total period of time including the first period of time and the second period of time, a first fractional variable for the first user, and a second fractional variable for the second user; processing, using a machine learning model, the first usage profile stored with respect to the first user and the second usage profile stored with respect to the second user to determine an updated first fractional variable for the first user and an updated second fractional variable for the second user; and based on the first fractional variable and the updated first fractional variable for the first user differing greater than a threshold, assigning a first portion of the total resource usage to the first user based on the first fractional variable and a second portion of the total resource usage to the second user based on the second fractional variable.
2. A method comprising: in response to determining a first user of the vehicle based on authentication provided by the first user, executing one or more sensor functions to store, with respect to the first user, first information from a plurality of sensors associated with the vehicle, the first information including sensor data related to usage of the vehicle by the first user and sensor data related to storage and fueling of the vehicle while associated with the first user during a first period of time; at a time subsequent to the first period of time, in response to determining a second user of the vehicle based on authentication provided by the second user, executing the one or more sensor functions to store, with respect to the second user, second information from the plurality of sensors associated with the vehicle, the second information including sensor data related to usage of the vehicle by the second user and sensor data related to storage and fueling of the vehicle while associated with the second user during a second period of time; retrieving total resource usage associated with the vehicle for a total period of time including the first period of time and the second period of time; processing, using a machine learning model, the first information stored with respect to the first user and the second information stored with respect to the second user to determine a first fractional variable for the first user and a second fractional variable for the second user; and assigning a first portion of the total resource usage to the first user based on the first fractional variable and a second portion of the total resource usage to the second user based on the second fractional variable.
3. A method comprising: in response to determining a first user of a vehicle, executing one or more sensor functions to store, with respect to the first user, first information from a plurality of sensors associated with the vehicle during a first period of time; at a time subsequent to the first period of time, in response to determining a second user of the vehicle, executing the one or more sensor functions to store, with respect to the second user, second information from the plurality of sensors associated with the vehicle during a second period of time; retrieving total resource usage associated with the vehicle for a total period of time including the first period of time and the second period of time; processing, using a machine learning model, the first information stored with respect to the first user and the second information stored with respect to the second user to determine a first fractional variable for the first user and a second fractional variable for the second user; and assigning a first portion of the total resource usage to the first user based on the first fractional variable and a second portion of the total resource usage to the second user based on the second fractional variable.
4. The method of any one of the preceding embodiments, wherein retrieving the total resource usage associated with the vehicle for the total period of time including the first period of time and the second period of time further comprises: retrieving changes in terrain measured by an accelerometer, a gyroscope, a GPS, a LiDAR scanner, a radar scanner, or a camera module during the total period of time; and incorporating the changes in the terrain into the total resource usage associated with the vehicle.

5. The method of any one of the preceding embodiments, wherein retrieving the total resource usage associated with the vehicle for the total period of time including the first period of time and the second period of time further comprises: retrieving changes in velocity measured by a speedometer, a GPS, an accelerometer, or power meter during the total period of time; and incorporating the changes in the velocity into the total resource usage associated with the vehicle.

6. The method of any one of the preceding embodiments, wherein retrieving the total resource usage associated with the vehicle for the total period of time including the first period of time and the second period of time further comprises: retrieving changes in an operating temperature by using a coolant temperature sensor, a cylinder head temperature sensor, or an exhaust gas temperature sensor during the total period of time; and incorporating the changes in the operating temperature into the total resource usage associated with the vehicle.

7. The method of any one of the preceding embodiments, wherein retrieving the total resource usage associated with the vehicle for the total period of time including the first period of time and the second period of time further comprises: retrieving changes in environmental conditions by using a thermometer, a hygrometer, a camera, or a LiDAR scanner during the total period of time; and incorporating the changes in the environmental conditions into the total resource usage associated with the vehicle.

8. The method of any one of the preceding embodiments, wherein retrieving the total resource usage associated with the vehicle for the total period of time including the first period of time and the second period of time further comprises: retrieving changes in surface conditions by using an accelerometer, a GPS, or a gyroscope during the total period of time; and incorporating the changes in the surface conditions into the total resource usage associated with the vehicle.

9. The method of any one of the preceding embodiments, wherein retrieving the total resource usage associated with the vehicle for the total period of time including the first period of time and the second period of time further comprises: retrieving changes in a status of vehicle systems using an on-board diagnostics (OBD) port during the total period of time; and incorporating the changes in the status of the vehicle systems into the total resource usage associated with the vehicle.

10. The method of any one of the preceding embodiments, wherein retrieving the total resource usage associated with the vehicle for the total period of time including the first period of time and the second period of time further comprises: retrieving changes in engine stress using an accelerometer, a tachometer, or a strain gauge during the total period of time; and incorporating the changes in the engine stress into the total resource usage associated with the vehicle.

11. The method of any one of the preceding embodiments, wherein the authentication provided by the first user is a knowledge-based method, possession-based method, or inherence-based method, wherein the knowledge-based method comprises something known by the first user, wherein the possession-based method comprises something the first user has, and wherein an inherence-based method comprises something the first user is.

12. The method of any one of the preceding embodiments, wherein retrieving the total resource usage associated with the vehicle for the total period of time including the first period of time and the second period of time further comprises: inputting, to the machine learning model, the first portion of the total resource usage, wherein the machine learning model is an artificial neural network (ANN), and wherein the first portion of the total resource usage includes a plurality of inputs for the ANN; receiving, as an output, probabilities corresponding to the plurality of inputs from the first portion of the total resource usage; and calculating the total resource usage using the output.

13. One or more non-transitory, computer-readable media storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for adaptive sensor-based provisioning for one or more users of an electric vehicle, comprising:

one or more processors; and one or more non-transitory, computer-readable media storing instructions that, when executed by the one or more processors, cause operations comprising:

in response to determining a first user of the electric vehicle based on biometric identification provided by the first user, executing one or more sensor functions to store, with respect to the first user, a first usage profile based on information from a plurality of sensors associated with the electric vehicle, the first usage profile including sensor data related to usage of the electric vehicle by the first user and sensor data related to storage and charging of the electric vehicle while associated with the first user during a first period of time;

at a time subsequent to the first period of time, in response to determining a second user of the electric vehicle based on biometric identification provided by the second user, executing the one or more sensor functions to store, with respect to the second user, a second usage profile from the plurality of sensors associated with the electric vehicle, the second usage profile including sensor data related to usage of the electric vehicle by the second user and sensor data related to storage and charging of the electric vehicle while associated with the second user during a second period of time; and using a machine learning model configured to input information from the first usage profile and the second user profile, determine a first fractional variable that indicates resource usage of the electric vehicle by the first user and a second fractional variable that indicates resource usage of the electric vehicle by the second user, and provide output for assigning a first portion of total resource usage of the electric vehicle to the first user and a second portion of the total resource usage to the second user, wherein the total resource usage of the electric vehicle is based on information regarding changes in engine stress.

2. The system of claim 1, wherein the machine learning model is an artificial neural network (ANN), and wherein the first portion of the total resource usage includes a plurality of inputs for the ANN.

3. A method for sensor-based provisioning for one or more users of a vehicle, the method comprising:

in response to determining a first user of the vehicle based on authentication provided by the first user, executing one or more sensor functions to store, with respect to the first user, first information from a plurality of sensors associated with the vehicle, the first information including sensor data related to usage of the vehicle by the first user and sensor data related to storage and fueling of the vehicle while associated with the first user during a first period of time;

at a time subsequent to the first period of time, in response to determining a second user of the vehicle based on authentication provided by the second user, executing the one or more sensor functions to store, with respect to the second user, second information from the plurality of sensors associated with the vehicle, the second information including sensor data related to usage of the vehicle by the second user and sensor data related to storage and fueling of the vehicle while associated with the second user during a second period of time;

using an accelerometer, a tachometer, or a strain gauge to identify information regarding changes in engine stress during a total period of time that includes the first period of time and the second period of time; and using a machine learning model configured to input the first information stored with respect to the first user and the second information stored with respect to the second user to determine a first fractional variable for the first user and a second fractional variable for the second user and provide an output for assigning at least one of a first portion of a total resource usage to the first user based on the first fractional variable or a second portion of the total resource usage to the second user based on the second fractional variable, wherein the total resource usage is based on the information regarding the changes in the engine stress.

4. The method of claim 3, wherein the total resource usage is further based on changes in terrain measured by an accelerometer, a gyroscope, a GPS, a LIDAR scanner, a radar scanner, or a camera module during the total period of time.

5. The method of claim 3, wherein the total resource usage is further based on changes in velocity measured by a speedometer, a GPS, an accelerometer, or power meter during the total period of time.

6. The method of claim 3, wherein the total resource usage is further based on changes in an operating temperature measured by using a coolant temperature sensor, a cylinder head temperature sensor, or an exhaust gas temperature sensor during the total period of time.

7. The method of claim 3, wherein the total resource usage is further based on changes in environmental conditions measured by using a thermometer, a hygrometer, a camera, or a LiDAR scanner during the total period of time.

8. The method of claim 3, wherein the total resource usage is further based on changes in surface conditions measured by using an accelerometer, a GPS, or a gyroscope during the total period of time.

9. The method of claim 3, wherein the total resource usage is further based on changes in a status of vehicle systems determined using an on-board diagnostics (OBD) port during the total period of time.

10. The method of claim 3, wherein the authentication provided by the first user is a knowledge-based method, possession-based method, or inherence-based method, wherein the knowledge-based method comprises something known by the first user, wherein the possession-based method comprises something the first user has, and wherein an inherence-based method comprises something the first user is.

11. The method of claim 3, wherein using the machine learning model comprises:

inputting, into the machine learning model, the first portion of the total resource usage, wherein the machine learning model is an artificial neural network (ANN), and wherein the first portion of the total resource usage includes a plurality of inputs for the ANN;

receiving, as an output, probabilities corresponding to the plurality of inputs from the first portion of the total resource usage; and calculating the total resource usage using the output.

12. One or more non-transitory, computer-readable media comprising instructions recorded thereon that, when executed by one or more processors, causes operations comprising:

in response to determining a first user of a vehicle, executing one or more sensor functions to store, with respect to the first user, first information from a plurality of sensors associated with the vehicle during a first period of time;

at a time subsequent to the first period of time, in response to determining a second user of the vehicle, executing the one or more sensor functions to store, with respect to the second user, second information from the plurality of sensors associated with the vehicle during a second period of time;

inputting, into a machine learning model, a first portion of total resource usage associated with the vehicle for a total period of time including the first period of time and the second period of time, wherein the machine learning model is an artificial neural network (ANN), and wherein the first portion of the total resource usage includes a plurality of inputs for the ANN; and receiving, from the machine learning model, an output that is used to determine the total resource usage and indicates probabilities corresponding to the plurality of inputs from the first portion of the total resource usage, wherein the probabilities comprise a probability that the first portion of the total resource usage is associated with the first user and a probability that a second portion of the total resource usage is associated with the second user.

13. The one or more non-transitory, computer-readable media of claim 12, wherein the first information further comprises sensor data related to usage of the vehicle by the first user and sensor data related to storage and fueling of the vehicle while associated with the first user during the first period of time.

14. The one or more non-transitory, computer-readable media of claim 12, wherein the second information further comprises sensor data related to usage of the vehicle by the second user and sensor data related to storage and fueling of the vehicle while associated with the second user during the second period of time.

15. The one or more non-transitory, computer-readable media of claim 12, wherein the operations further comprise: incorporating changes in terrain into the total resource usage associated with the vehicle.

16. The one or more non-transitory, computer-readable media of claim 12, wherein the operations further comprise: incorporating changes in velocity into the total resource usage associated with the vehicle.

17. The one or more non-transitory, computer-readable media of claim 12, wherein the operations further comprise: incorporating changes in operating temperature into the total resource usage associated with the vehicle.

18. The one or more non-transitory, computer-readable media of claim 12, wherein the operations further comprise: incorporating changes in environmental conditions into the total resource usage associated with the vehicle.

19. The one or more non-transitory, computer-readable media of claim 12, wherein the operations further comprise: incorporating changes in surface conditions into the total resource usage associated with the vehicle.

20. The one or more non-transitory, computer-readable media of claim 12, wherein the operations further comprise: incorporating changes in a status of vehicle systems into the total resource usage associated with the vehicle.

* * * * *